Jan. 9, 1951 M. HANDSCHIN ET AL 2,537,406
METHOD OF AND ARRANGEMENT FOR REPEATING THE REPRODUCED TEXT IN AUTOMATIC TELEPHONOGRAPHS
Filed July 15, 1947
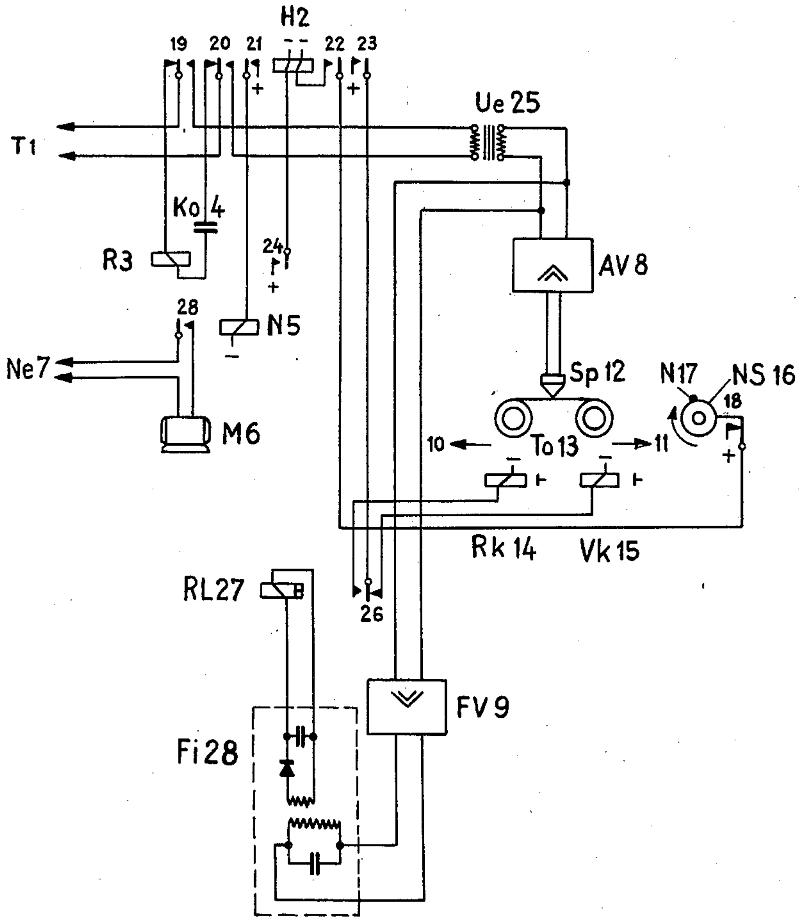
INVENTORS
MAX HANDSCHIN &
KURT WAGNER
BY Richards & Geier
ATTORNEYS Patented Jan. 9, 1951 2,537,406

UNITED STATES PATENT OFFICE 2,537,406

METHOD OF AND ARRANGEMENT FOR REPEATING THE REPRODUCED TEXT IN AUTOMATIC TELEPHONOGRAPHS

Max Handschin, Kusnacht-Zurich, and Kurt Wagner, Zurich, Switzerland, assignors to Daphne Investment Trust, Vaduz, Principality of Liechtenstein, a company of the Principality of Liechtenstein Application July 15, 1947, Serial No. 761,012
In Switzerland March 7, 1947

4 Claims. (Cl. 179—6)

In automatic telephonographs, the recorded text of which can be listened to over a telephone line, it is desirable that any passages of the text which have not been understood during the reproduction may be immediately repeated by the telephonograph. For this purpose, the sound recording and reproducing arrangement of the telephonograph must be so constructed and arranged that during the reproduction the record may be returned the desired amount at any moment by remote control over the telephone line so that upon the subsequent forward movement of the record the listener may again listen to those portions of the record which he did not understand.

In the known telephonographs, the disadvantage exists that if the calling subscriber does not understand the reproduction he must again listen by reproducing the entire text, including that which he has understood, which involves an unduly long use of the telephone line, waste of time and expense.

The present invention relates to means of which it is possible for the text recorded on automatic telephonographs to be repeated any number of times during the reproduction, and an arrangement for carrying out the method.

In accordance with this invention the listening subscriber transmits to the telephone circuit a vocal sound and the electric current impulses produced by this vocal sound are fed at the telephonograph to a filter which passes the current impulses which constitute at least one characteristic component of the vocal sound, and these current impulses which are thus filtered out are then employed to actuate means effecting the return of the text-reproducing arrangement.

The arrangement for carrying out the method is characterized by a valve amplifier, a filter passing at least the current impulses constituting one component of a vocal sound, a rectifier for rectifying the filtered-out current impulses and a relay actuated by the filtered-out current impulses and effecting the return of the text-reproducing arrangement.

The individual parts of the arrangement connected to the telephone circuit may be connected in series in various ways. For example, the filter and the rectifier can be connected between the amplifier and the relay, or the order of succession may be filter, amplifier, rectifier, relay. In the former case, the rectifier is preferably inductively coupled to the filter for the purpose of correct adaptation.

An example of a form of embodiment of the invention is more fully illustrated in the accompanying drawing, which shows only those parts of the telephonograph which are important to the understanding of the invention.

In the drawing, T1 is the telephone circuit or the subscriber speaking over the telephone circuit, Ue25 is a transformer, Ne7 a power supply main and M6 a motor driving the text-reproducing arrangement. The latter consists of a steel tape To13 with the associated rollers and the sound head Sp12. A cam disc NS16 actuating the contact 18 with the cams N17 is coupled to the mechanism of the text-reproducing mechanism with considerable reduction. The motor is coupled with the mechanism of the text-reproducing arrangement by the magnetic couplings Rk14 and Vk15, the magnetic coupling Vk15 being provided for forward movement and the coupling Rk for rearward movement. The two directions of rotation of the text-reproducing mechanism are indicated by the arrows 11 and 10. The amplification of the voltage produced by the sound head Sp12 is effected by the amplifier AV8, while the relays R3, H2 and N5 serve to set the text-reproducing arrangement in operation. The actual repeater comprises the amplifier FV9, the filter Fi28 with the rectifier connected thereto and the relay RL27 which controls the energization of the magnetic couplings Rk14 and Vk15.

The contacts actuated by the individual relay cores are each shown in alinement with the extended axis of the respective relay cores. The negative and positive signs in the drawing represent the negative and positive poles of the source of current from which the relays and the magnetic couplings are fed. In the following description of the operation of the arrangement, the positive pole of the source of current is considered as being grounded and is designated throughout as "earth" and the negative pole as "negative."

The arrangement operates as follows:

When the subscriber T1 calls the telephonograph through the telephone circuit, the relay R3 is energized by the calling current which energizes the circuit:

(1) Subscriber T1, contact 19, relay R3, condenser Ko4, contact 20 and back to the subscriber T1.

By the energization of relay R3, relay H2 is energised by the circuit:

(2) Earth, contact 24, relay H2, negative. The relay H2 is maintained energized by the cam contact 18, assuming that the sound carrier To13 is already switched to text reproduction. For the holding of the relay H2 the following circuit is closed:

(3) Earth, contact 18, contact 22, holding coil of relay H2, negative.

By the energization of relay H2, the subscriber in the first place is connected to the transformer Ue25, and in addition the contact 21 actuates the mains relay N5, which closes its contact 29 and connects the motor M6 to the power supply main Ne7. The following circuits are closed:

(4) Earth, contact 21, relay N5, negative.

(5) Supply main Ne7, contact 29, motor M6, main Ne7.

By the closing of the contact 23, the following circuit is closed for the energization of the forward coupling Vk15:

(6) Contact 23, contact 26, Vk15, negative.

In this way, the sound carrier and with it the cam disc NS16 coupled thereto is set in motion in the direction of the arrow 11. The subscriber T1 then hears the text recorded on the sound carrier, through the circuit:

(7) Subscriber T1, contact 19, transformer Ue25, amplifier AV8, sound head Sp12 and back to the amplifier AV8, transformer Ue25, contact 20, subscriber T1.

If the subscriber T1 has failed to understand a certain word or a certain sentence, he is able according to the present invention to initiate a so-called remote repetition by speaking a vocal sound, for example a J, into the microphone. The means for producing the remote repetition consist of the amplifier FV9 and a filter Fi28 tuned to at least one characteristic component (harmonic) of the vocal sound.

It is known that in the vocal sounds of the human voice the timbre and consequently the characteristic harmonics (components) of the vocal sound always lie approximately at the same point of the frequency spectrum independently of the height of the basic tone and of the person speaking. The invention utilises this phenomenon in that the harmonics which only occur with one vocal sound are filtered out by a filter. If, for example, the subscriber T1 pronounces a longer J, the filter Fi28 is thereby energised and the secondary winding coupled therewith feeds a rectifier. The direct current produced by this rectifier actuates in the known manner a highly sensitive relay RL27. This relay has retarded attraction, whereby the possibility is avoided that words comprising shorter vocal sounds which are emitted by the sound carrier To13 will influence the relay RL27; if, however, the subscriber T1 emits the vocal sound J selected for our example, the following circuit for actuating the relay RL27 is energized:

(8) Subscriber T1, contact 19, transformer Ue25, filter amplifier FV9, filter Fi28 and return to filter amplifier FV9, transformer Ue25, contact 20, subscriber T1.

The current impulses induced in the secondary coil in the filter Fi28 are rectified by the rectifier forming a part of the filter and produce a direct current of sufficient magnitude to energize the relay RL27 whose armature is actuated to disconnect the contact 26 from the circuit for the forward coupling VK15 and connects it with the circuit for the rearward coupling RK14 and continues to maintain this last mentioned circuit closed and the coupling engaged as long as the subscriber sounds the vocal J in his microphone. The result is that owing to the disconnection of the forward coupling VK15 and the engagement of the rearward coupling RK14 the sound carrier To13 is moved rearwardly in the direction of the arrow 10. During this rearward movement of the sound carrier the following circuit containing the winding of the coupling RK14 is closed:

(9) Earth, contact 23, contact 26, coupling RK14, minus.

The above circuit (8) becomes deenergized when the subscribed discontinues to sound the vocal J into his microphone and the relay RL27, after the expiration of the time determining its delayed action, drops its armature, with the result that the contact 26 automatically opens the circuit for the rearward coupling RK14 and closes the circuit for the forward coupling VK15, thereby reestablishing the circuit (5) and causing again a forward movement of the sound carrier T13.

It is believed obvious from the above that the subscriber is able to repeat this rearward movement of the sound carrier as often as he desires by merely sounding the vocal J into his microphone.

At the end of the reproduction of the sound on the sound carrier the cam disc NS16, which as stated previously is coupled by a reduction gear or the like with sound carrier T16, opens the contact 18. This action opens the holding circuit (3) of the relay H2 and the armature of the latter drops and thereby the previously mentioned circuits (4), (5), (6) and (7) are opened.

We claim:

1. In a sound reproducing system, an automatic telephonograph including a magnetic sound carrier, a sound head, driving means for selectively moving said sound carrier in a forward and a rearward direction relatively to said sound head, circuit means connecting said sound head with a telephone circuit leading to a remotely arranged telephone subscriber, means operated by the calling current in said telephone circuit for causing said driving means to move said sound carrier in a forward direction, whereby said sound head reproduces the sound recorded on said sound carrier and transmits it to said telephone subscriber, means causing a rearward movement of said sound carrier including a filter circuit with a filter, a rectifier, and means including a relay operated by the rectified current impulses having passed through said filter, means connecting said filter circuit to said circuit means and whereby said filter circuit is adapted to pass solely electric current impulses which are produced by a predetermined component of a vocal sound transmitted by the remote telephone subscriber to said telephone circuit, and means operated by said relay when energized by said rectified electric current impulses to cause said driving means to discontinue the forward movement of said sound carrier and to cause said driving means to move said sound carrier rearwardly as long as said relay remains energized, and means whereby said relay upon deenergisation reestablishes said forward movement of said sound carrier by said driving means.

2. In a sound reproducing system, a telephonograph including a magnetic sound carrier, an electric motor, two electromagnetic couplings, means for selectively connecting said motor drivingly with said sound carrier, whereby one of said couplings drives said sound carrier in a forward direction and the other coupling drives said sound carrier in a rearward direction, a sound head cooperating with said sound carrier, and circuit means connecting said sound head with a telephone circuit leading to a remotely arranged telephone subscriber, means operated by the calling current in said telephone circuit for causing said electric motor to operate and the coupling for the forward drive of said sound carrier to be energized, a filter circuit including means connecting the same to said circuit means, said filter circuits being constructed to pass electric current impulses which are produced by at least one characteristic component of a vocal sound transmitted by the telephone subscriber to the telephone circuit, a relay energisable by said electric current impulses, and a contact device controlled by said relay for causing upon energisation of said relay a deenergization of the coupling for the forward drive of said sound carrier and an energization and engagement of the coupling for the rearward drive of said sound carrier, and means including said contact device for reestablishing an engagement of said forward drive coupling upon discontinuance of said electric current impulses produced by said vocal sound and having passed said filter.

3. In a sound reproducing system, a telephonograph including a magnetic sound carrier, an electric motor and two couplings, means for selectively connecting said motor with said sound carrier, whereby one of said couplings drives said sound carrier in a forward direction and the other one drives said sound carrier in a rearward direction, a sound head cooperating with said sound carrier, and circuit means connecting said sound head with a telephone circuit leading to a remotely positioned telephone subscriber, means operated by the calling current in said telephone circuit for causing said electric motor to be set in operation and causing the coupling for the forward drive of the sound carrier to engage, and means causing a rearward movement of said sound carrier including a filter circuit connected to said circuit means and comprising a valve amplifier, a filter, a rectifier and a relay operated by the rectified current impulses, said filter circuit being constructed to pass solely electric current impulses which are produced by a predetermined component of a vocal sound transmitted by the telephone subscriber to the telephone circuit, and means operated by said relay when energized by said rectified electric current impulses for disengaging said coupling for the forward movement of said sound carrier and for engaging the coupling for the rearward movement of the same, said last named means reestablishing an engagement of said forward drive coupling upon deenergisation of said relay.

4. The combination with an automatic telephonograph provided with means for reproducing a text recorded on a sound record, and means for selectively moving said sound record in a forward and rearward direction, of means for repeating any part of said recorded text, said last named means including a telephone circuit adapted to transmit the recorded text to any listener connectable with said telephonograph, and a repeater circuit connected to said telephone circuit, said repeater circuit comprising a valve amplifier, a filter and a rectifier, means whereby said circuit is responsive at any time during the reproduction of the recorded text to a vocal sound which when produced by the listener and fed into said telephone circuit is amplied and fed into said filter which passes a predetermined portion of the electric current impulses produced by said vocal sound to said rectifier, and means including a relay actuated by the rectified current, said relay when actuated acting on said record moving means and causing said sound record to be moved backward and when no longer actuated causing said record moving means to move said sound record forward again for repeated production of the desired portion of the recorded text.

MAX HANDSCHIN.
KURT WAGNER.

REFERENCES CITED

The following references are of record in the file of this patent:

UNITED STATES PATENTS

| Number | Name | Date |
|---|---|---|
| 1,765,471 | Wemsley | June 24, 1900 |
| 2,200,351 | Whitehead et al. | May 14, 1940 |
| 2,329,107 | Clausen | Sept. 7, 1943 |
| 2,333,235 | Clausen | Nov. 2, 1943 |